(12) United States Patent
Girsig et al.

(10) Patent No.: US 8,886,646 B2
(45) Date of Patent: Nov. 11, 2014

(54) FIELD EXTENSIBILITY FOR ANALYTICAL REPORTS

(75) Inventors: Stefan Girsig, Heidelberg (DE); Karl-Peter Nos, Nussloch (DE); Silke Gruber, Sinsheim (DE); Albrecht Richter, Oestringen (DE); Stefan Biedenstein, Bad Schonborn (DE)

(73) Assignee: SAP SE, Walldorf (DE)

( * ) Notice: Subject to any disclaimer, the term of this patent is extended or adjusted under 35 U.S.C. 154(b) by 456 days.

(21) Appl. No.: 12/981,844

(22) Filed: Dec. 30, 2010

(65) Prior Publication Data
US 2012/0173522 A1    Jul. 5, 2012

(51) Int. Cl.
*G06Q 10/10* (2012.01)

(52) U.S. Cl.
CPC ..................................... *G06Q 10/10* (2013.01)
USPC .......................................... 707/736; 707/803

(58) Field of Classification Search
USPC ................................................. 707/736, 803
See application file for complete search history.

(56) References Cited

U.S. PATENT DOCUMENTS

| | | | |
|---|---|---|---|
| 5,918,232 A * | 6/1999 | Pouschine et al. | 707/999.002 |
| 6,182,060 B1 * | 1/2001 | Hedgcock et al. | 707/999.001 |
| 6,418,448 B1 | 7/2002 | Sarkar | |
| 6,434,544 B1 * | 8/2002 | Bakalash et al. | 707/999.002 |
| 7,222,130 B1 * | 5/2007 | Cras et al. | 707/803 |
| 7,318,066 B2 | 1/2008 | Kaufman et al. | |
| 7,454,701 B2 * | 11/2008 | Graeber | 715/267 |
| 2003/0093755 A1 | 5/2003 | O'Carroll | |
| 2005/0021536 A1 | 1/2005 | Fiedler et al. | |
| 2005/0172261 A1 * | 8/2005 | Yuknewicz et al. | 717/106 |
| 2005/0183002 A1 | 8/2005 | Chapus | |
| 2005/0229186 A1 | 10/2005 | Mitchell et al. | |
| 2006/0101091 A1 | 5/2006 | Carbajales et al. | |
| 2006/0179028 A1 | 8/2006 | Bram et al. | |
| 2006/0206507 A1 | 9/2006 | Dahbour | |
| 2006/0225032 A1 | 10/2006 | Klerk et al. | |
| 2006/0230066 A1 | 10/2006 | Kosov et al. | |

(Continued)

FOREIGN PATENT DOCUMENTS

| | | |
|---|---|---|
| EP | 1 494 131 A1 | 6/2003 |
| WO | 2005/098593 A2 | 10/2005 |

OTHER PUBLICATIONS

Willis, G. "Architecture SIG—Feb. 2007", Internet Article, [Online], Feb. 2007, XP002552304, [retrieved on Oct. 26, 2009], Retrieved from the Internet: URL: http://www.acs.org.au/nsw/sigs/architecture//Architecture-200702.pdf>, (pp. 1-44, total 44 pages).

(Continued)

*Primary Examiner* — Cam-Y Truong
(74) *Attorney, Agent, or Firm* — Buckley, Maschoff & Talwalkar LLC

(57) ABSTRACT

A system may include reception of an instruction to add an extension field to a node of a business object object model, identification of at least one multi-dimensional analytical view object model including a reference field referring to the node of the business object object model, determination of at least one report associated with the determined at least one multi-dimensional analytical view object model, reception of a selection of one of the at least one report, extension of the one of the at least one multi-dimensional analytical view object model associated with the report based on the extension field, and extension of the selected report based on the extension field.

12 Claims, 13 Drawing Sheets

(56) References Cited

U.S. PATENT DOCUMENTS

| | | |
|---|---|---|
| 2006/0294141 A1 | 12/2006 | Tsang et al. |
| 2007/0043715 A1 | 2/2007 | Kaushik et al. |
| 2007/0088716 A1 | 4/2007 | Brumme et al. |
| 2007/0239711 A1 | 10/2007 | Unnebrink et al. |
| 2007/0261026 A1 | 11/2007 | Berger et al. |
| 2007/0276811 A1 | 11/2007 | Rosen |
| 2008/0005623 A1 | 1/2008 | Said |
| 2008/0027893 A1 | 1/2008 | Cavestro et al. |
| 2008/0109436 A1 | 5/2008 | Klein et al. |
| 2008/0162622 A1 | 7/2008 | Becker et al. |
| 2008/0163253 A1 | 7/2008 | Massmann et al. |
| 2008/0195964 A1 | 8/2008 | Randell |
| 2008/0275844 A1 | 11/2008 | Buzsaki et al. |
| 2008/0301124 A1* | 12/2008 | Alves et al. ............ 707/5 |
| 2008/0319942 A1 | 12/2008 | Courdy et al. |
| 2009/0063500 A1 | 3/2009 | Zhai et al. |
| 2009/0249446 A1 | 10/2009 | Jenkins et al. |
| 2009/0271158 A1* | 10/2009 | Yeh et al. ............ 703/2 |
| 2010/0153432 A1* | 6/2010 | Pfeifer et al. ............ 707/769 |
| 2010/0161648 A1 | 6/2010 | Eberlein et al. |
| 2011/0153505 A1* | 6/2011 | Brunswig et al. ............ 705/301 |
| 2011/0282704 A1* | 11/2011 | Graeber et al. ............ 705/7.11 |
| 2012/0023130 A1 | 1/2012 | Schlarb et al. |
| 2012/0030256 A1* | 2/2012 | Pfeifer et al. ............ 707/810 |

OTHER PUBLICATIONS

Taylor, M. et al., "Data Integration and Composite Business Services, Part 3: Build a multi-tenant data tier with access control and security", Internet Article, [Online], Dec. 13, 2007, XP002552301, [retrieved on Oct. 26, 2009], Retrieved from the Internet: URL: http://www.ibm.com/developerworks/data/library/techarticle/dm-0712taylor/>, (pp. 1-16, total 16 pages).

Joseph W. Yoder et al., "Architecture and Design of Adaptive Object-Models", ACM SIGPLAN Notices, XP-002249967, vol. 36, No. 12, Dec. 2001, pp. 50-60 (total 11 pgs.).

Miguel A. Castro, "Web Control Enhancements in ASP.net 2.0", first published on Feb. 28, 2008, Internet URL: http://web.archive.org/web/20080228060745/http:www.devx.com/codemag/Article/3265 . . . 5pgs.

"Non-Final Office Action" mailed Mar. 23, 2011, for U.S. Appl. No. 12/339,328, entitled "UI-Driven Binding of Extension Fields to Business Objects", filed Dec. 19, 2008, 23pgs.

"Final Office Action" mailed Oct. 4, 2011, for U.S. Appl. No. 12/339,328, entitled "UI-Driven Binding of Extension Fields to Business Objects", filed Dec. 19, 2008, 23pgs.

"Non-Final Office Action" mailed Jan. 31, 2012, for U.S. Appl. No. 12/829,617, entitled "Extensibility of Metaobjects", filed Jul. 2, 2010, 21pgs.

"Non-Final Office Action" mailed May 9, 2012, for U.S. Appl. No. 12/339,328, entitled "UI-Driven Binding of Extension Fields to Business Objects", filed Dec. 19, 2008, 28pgs.

"Non-Final Office Action" mailed Jun. 4, 2012, for U.S. Appl. No. 12/847,311, entitled "Stable Anchors in User Interface to Support Life Cycle Extensions", filed Jul. 30, 2010, 14pgs.

"Final Office Action" mailed Jun. 27, 2012, for U.S. Appl. No. 12/829,617, entitled "Extensibility of Metaobjects", filed Jul. 2, 2010, 22pgs.

"Advisory Action" mailed Sep. 14, 2012, for U.S. Appl. No. 12/829,617, entitled "Extensibility of Metaobjects", filed Jul. 2, 2010, 3pgs.

"Non-Final Office Action" mailed Sep. 17, 2012, for U.S. Appl. No. 12/847,409, entitled "Common Modeling of Data Access and Provisioning for Search, Query, Reporting, and/or Analytics", filed Jul. 30, 2010, 9pgs.

"Final Office Action" mailed Oct. 18, 2012, for U.S. Appl. No. 12/339,328, entitled "UI-Driven Binding of Extension Fields to Business Objects", filed Dec. 19, 2008, 20pgs.

* cited by examiner

SAP Business ByDesign    Collaborate    Search in [____] for [____]    Go    Logout

Further Usage of Extension Field

Extension Field: Region
Business Context: Sales Order

Form Templates | Data Sources and Reports | Enterprise Search

[Add Field]

| Data Source (810) | Report (820) | Field To be added (830) |
|---|---|---|
| ▶ Lead Funnel (CRMLEFU) | | ☐ |
| ▼ Opportunity Funnel (CRMOPFU) | | ☑ |
| • Opportunity Funnel (CRMOPFU) | Opportunity Funnel (CRMOPFU_MQ0001) | ☐ |
| • Opportunity Funnel (CRMOPFU) | Opportunity Funnel (CRMOPFU_MQ0001) | ☑ |
| • Sales Order Header (CRMSLOHB) | | ☐ |
| ▼ Sales Order Item (CRMSLOIB) | | ☑ |
| • Sales Order Item (CRMSLOIB) | Sales Order Volume (CRMSLOIB_MQ001) | ☐ |
| • Sales Order Item (CRMSLOIB) | Sales Order Volume (CRMSLOIB_Q001) | ☑ |

*FIG. 8*

FIELD EXTENSIBILITY FOR ANALYTICAL REPORTS

FIELD

Some embodiments relate to business objects within a business process platform. More specifically, some embodiments relate to the use of extension fields within consuming business entities of a business process platform.

BACKGROUND

An application platform may implement metadata models to support different business solutions. Metadata models may include generic models of a business object, a floorplan (i.e., a user interface layout), user interface text, a process component, and a message type, among others. A business object, for example, is a software model representing real-world items used during the transaction of business. An instance of a business object metadata model may comprise a SalesOrder object model or an Organization object model. Instances of these object models, in turn, represent specific data (e.g., SalesOrder 4711, ACME corporation).

An instance of a business object metadata model (e.g., a SalesOrder object model or, more generically, a business object object model) may specify business logic and/or data having any suitable structure. The structure may be determined based on the requirements of a business scenario in which the instance is to be deployed. A business application for a particular business scenario may require many business object object models, where the structure of each has been determined based on the requirements of the particular business scenario.

The data stored by an application platform is typically accessed according to one of two primary modalities. The first, which may be referred to as an operational modality, involves accessing and modifying the data during the day-to-day course of business. The operational modality may include, for example, reviewing and updating inventory, inputting sales figures, issuing paychecks based on salary and attendance data, etc.

An analytical modality, on the other hand, generally consists of strategic analysis of business data. Activities of the analytical modality may include comparison of profit margins by location, product and/or year, sales by brand, etc. Of course some activities may be arguably classified as belonging to either the analytical modality or the operational modality.

A software solution may provide data queries, user interfaces and reports for presenting the data underlying business object object models. These queries, interfaces and reports are developed by the solution provider based on knowledge of the structure and semantics of the business object object models. Customers and partners may customize or develop similar queries, interfaces and reports, based also on the business object object models.

A customer deploying such a software solution might use pre-defined user interfaces to interact with the business objects. Often, however, a customer will want to customize these user interfaces based on the business needs of the customer. For example, a customer may wish to change a user interface associated with a SALES_ORDER business object by adding a "Sub-Product Identifier" field next to an existing "Product Identifier" field.

In order to maintain internal consistency of the software solution, this change requires modification of the user interface and of the SALES_ORDER business object. In particular, the SALES_ORDER business object is modified to include the extension field "Sub-Product Identifier". Commonly-assigned co-pending U.S. patent application Ser. No. 12/339,328, entitled "UI-Driven Binding Of Extension Fields To Business Objects", describes systems for facilitating the above-described change. The contents of U.S. patent application Ser. No. 12/339,328 are incorporated herein by reference for all purposes.

Although extension fields may be available for consumption by user interfaces, print forms, and service interfaces within the software solution, conventional systems do not facilitate usage of extension fields within analytical reports. Improved systems for utilizing extension fields within analytical reports are desired.

BRIEF DESCRIPTION OF THE DRAWINGS

FIG. 4 is a view of a user interface according to some embodiments.

Figure 5:
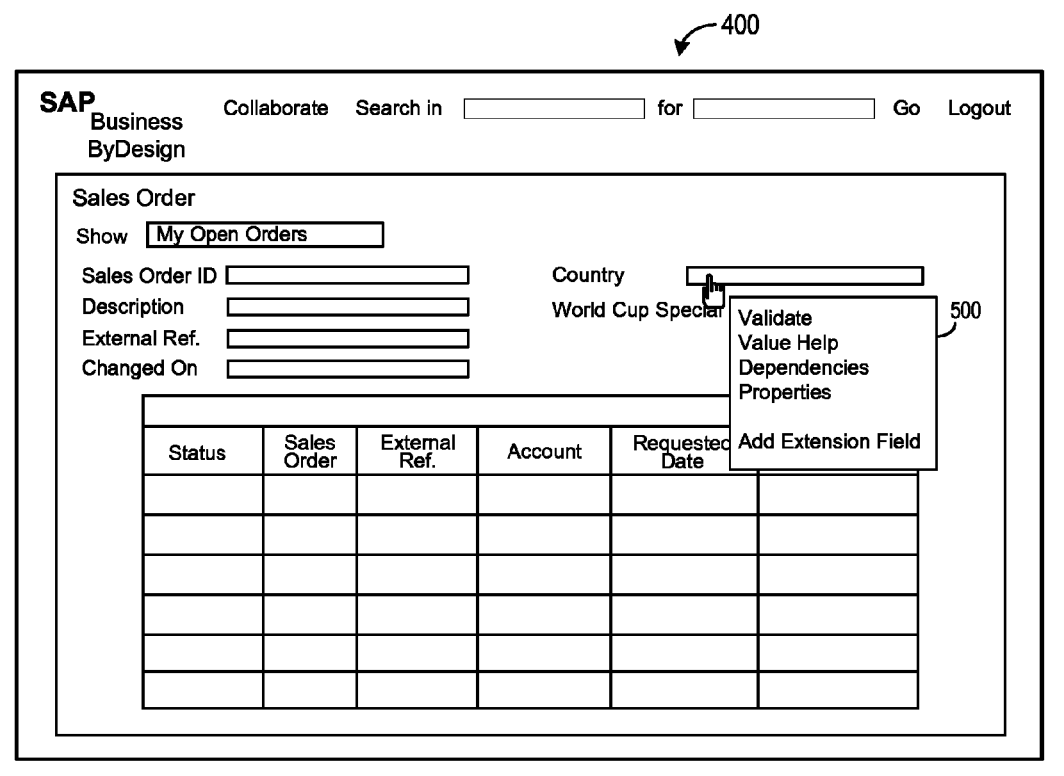

FIG. 5 is a view of a user interface according to some embodiments.

FIG. 7 is a view of a user interface according to some embodiments.

FIG. 8 is a view of a user interface to select a report to extend according to some embodiments.

DETAILED DESCRIPTION

Figure 1:
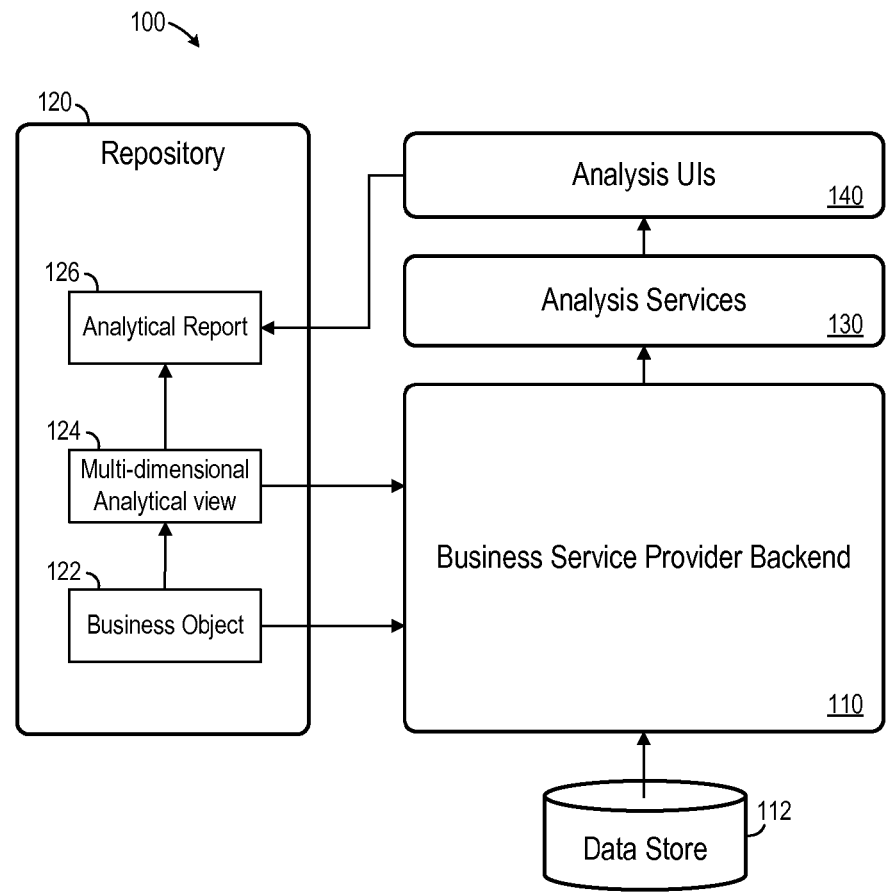
FIG. 1 is a block diagram of a system according to some embodiments.

FIG. 1 is a block diagram of system 100 according to some embodiments. FIG. 1 represents a logical architecture for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Moreover, each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable media. Such media may include, for example, a floppy disk, a CD-ROM, a DVD-ROM, a Zip® disk, magnetic tape, and solid state Random Access Memory (RAM) or Read Only Memory (ROM) storage units. Embodiments are therefore not limited to any specific combination of hardware and software.

System 100 includes business service provider backend 110 for providing business services to consumers (not shown) of system 100. For example, business service provider backend 110 might store customer information into and retrieve customer information from physical tables of data store 112. Data store 112 may comprise a relational database, a multi-dimensional database, an eXtendable Markup Language (XML) document, or any other structured data storage system. The physical tables may be distributed among several relational databases, dimensional databases, and/or other data sources. To provide economies of scale, data store 112 may include data of more than one customer. Business service provider backend 110 includes mechanisms to ensure that a client accesses only the data that the client is authorized to access. Moreover, the data of data store 112 may be indexed and/or selectively replicated in an index to allow fast retrieval thereof.

The structures of and relationships between the physical database tables may be complex, and business object object models (referred to henceforth as "business objects") may be used to shield developers and end-users from these complexities. A business object may comprise, for example, a software model including nodes to encapsulate related data and methods. As described above, a business object may be associated with a business entity, such as a customer, partner, sales order, product, store, time, etc., represented in the data of a data source. Each instance of a business object may represent a particular instance of the entity represented by the business object. An instance of a SALES_ORDER business object may, for example, provide a mapping to the underlying tables storing data associated with a particular sales order.

Repository 120 includes metadata of various metadata models. These metadata models include metaobjects and instances of the metaobjects, referred to herein as object models or objects. The metaobjects and object models are defined by metadata of repository 120.

As mentioned above, the metaobjects may include generic models of a BI view, a floorplan, a business object, a user interface text, a process component, and a message type, but embodiments are not limited thereto. The metaobjects and object models may be embodied in any type of data structure, including but not limited to eXtensible Markup Language files. As in the conventional storage of object instance data, the metadata defining the specific metaobjects and object models may be stored in database tables and/or any other suitable format.

Each metaobject may comprise an instance of a same meta-metadata model (or meta-metaobject). The meta-metaobject may consist of nodes, composite associations, associations, elements structure and attribute properties. Development of specific business object metaobjects, specific floorplan metaobjects, etc. may therefore proceed using the same development technologies. Moreover, access and lifecycle issues of the various specific metaobjects may be managed using similar (or identical) mechanisms.

Business object 122 is an object model, or class. The metadata of business object 122 therefore provides information regarding the structure and attributes of the data of instances of business object 122. Accordingly, backend 110 uses the metadata to access corresponding data of data store 112. Business object 122 may include reference fields and/or extension fields as will be described below. Therefore, an extension field that is modeled within the metadata of repository 120 allows backend 110 to store and retrieve data associated with the extension field.

Analysis services 130 include any business services that are or become known. Examples include application programming interfaces (APIs) to access transient metadata, master data, transactional data and hierarchies. Analysis user interfaces (UIs) 140 may access business service provider backend 110 via analysis services 130. Analysis UIs 140 may include, for example, dashboards, spreadsheet applications, proprietary portals, etc.

Repository 120 also includes metadata of one or more multi-dimensional analytical view object models (MDAVs), which themselves are instances of an MDAV metadata model such as described in commonly-assigned, co-pending U.S. application Ser. No. 12/847,409, the contents of which are incorporated herein by reference. Generally, a multi-dimensional analytical view describes a view on a business object. As described in U.S. application Ser. No. 12/847,409, entitled "Common Modeling Of Data Access And Provisioning For Search, Query, Reporting And/Or Analytics", a query definition object (not shown) may define a query on a business object, and a multi-dimensional analytical view may define the results of the query as Key Figures or Characteristics. Moreover, the multi-dimensional analytical view may define rules which are used to calculate Key Figures and to define restrictions which will be used at runtime to set predefined filter parameters.

Metadata of analytical report 126 may provide analysis UIs 140 with a visual presentation of data underlying MDAV 124 and business object 122. The ability to associate analytical report 126 with MDAV 124 may facilitate the incorporation of semantically-rich information within analytical report 126. For example, analytical report 126 may simply refer to Key Figures which are calculated according to MDAV 124, without having to define a query for particular data of business object 122 or a calculation of the Key Figures based on that data.

According to some embodiments, an MDAV may be associated with more than one business object and a business object may be associated with more than one MDAV. In some embodiments, an MDAV may be associated with more than one analytical report.

Figure 2:
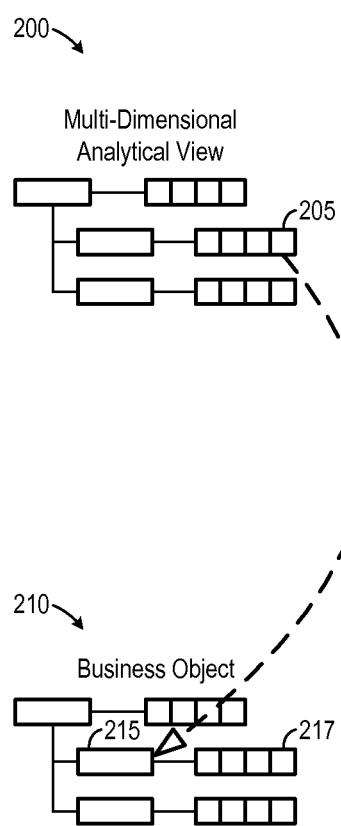
FIG. 2 illustrates the binding of a reference field to a node of a business object object model.

FIG. 2 provides a simple illustration of the structure of MDAV 200 and business object 210 according to some embodiments. As is known in the art, both MDAV 200 and business object 210 consist of nodes, fields, actions, data types, etc. MDAV 200 may comprise an instance of an MDAV metamodel, while business object 210 may comprise an instance of a business object metamodel. As mentioned above, the MDAV metamodel and the business object metamodel may comprise instances of a same meta-metamodel.

MDAV 200 includes reference field 205 which is associated with node 215 of business object 210. More particularly, the properties of reference field 205 indicate a path to node 215 of business object 210. According to some implementations, reference field 205 of MDAV 200 is a "release-stable" anchor to node 215. For example, a provider of MDAV 200 might promise to not change reference field 205 in future software updates. Clients and/or partners might then confidently use reference field 205 and its association with node 215 to design extensions, analytical reports, or other entities consuming MDAV 200.

Business object 210 also includes reference field 217 according to some embodiments. Reference field 217 may also comprise a "release-stable" anchor which allows the creation of extension fields based thereon. Systems to create business object extension fields based on business object reference fields are described in commonly-assigned, co-pending U.S. application Ser. No. 12/847,311, entitled "Stable Anchors In User Interface To Support Life Cycle Extensions".

As will be described in detail below, some embodiments may operate to extend a report (e.g., analytical report 126) based on an extension to a node of a business object underlying the report. Such extension may include determining a multi-dimensional analytical view object model including a reference field referring to the node of the business object, determining a report associated with the determined multi-dimensional analytical view object model, extending the multi-dimensional analytical view object model associated with the report based on the extension field, and extending the selected report based on the extension field.

Figure 3:
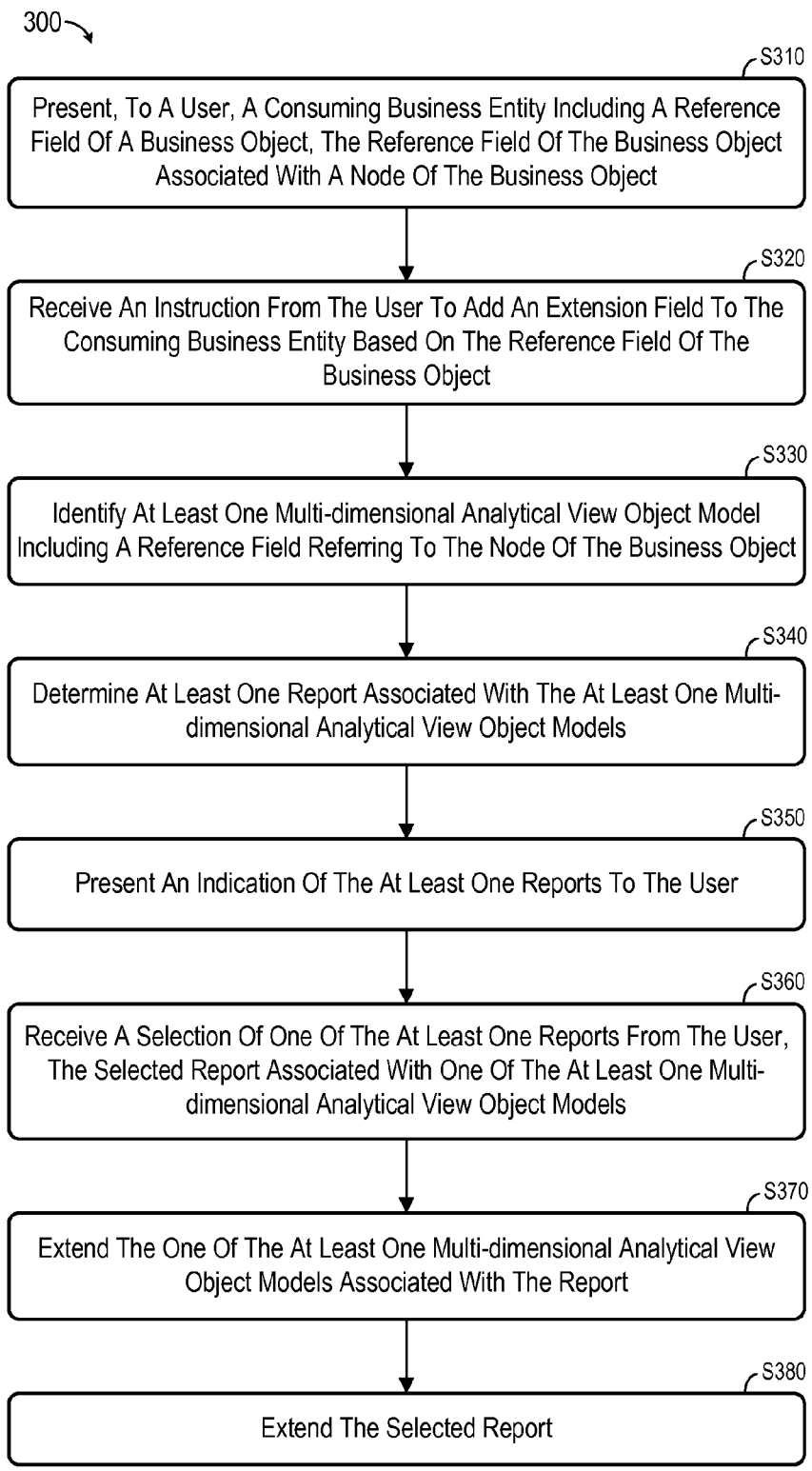
FIG. 3 is a flow diagram of a process according to some embodiments.

FIG. 3 is a flow diagram of a process 300 according to some embodiments. Business service provider backend 110 and/or repository 120 may execute portions of process 300 as will be described below, but embodiments are not limited thereto. In this regard, all processes described herein may be executed by any combination of hardware and/or software. The processes may be embodied in program code stored on a tangible medium and executable by a computing device to provide the functions described herein. The processes described herein do not imply a fixed order to their constituent steps, and embodiments may be practiced in any order that is practicable.

Prior to process 300, a developer of a business service provider may define reference fields for various consuming business entities. A reference field definition may point to a specific portion of a consuming business entity (e.g., a location on a user interface) and to a field in the data model of the user interface (i.e., as representing the path down to a corresponding persistent business object node). The definition may also indicate the underlying business object.

At S310, a consuming business entity is presented to a user. The consuming business entity includes a reference field, which in turn is associated with a node of the business object. For example, the consuming business entity may comprise a user interface including reference field 217 of business object node 215.

Figure 4:
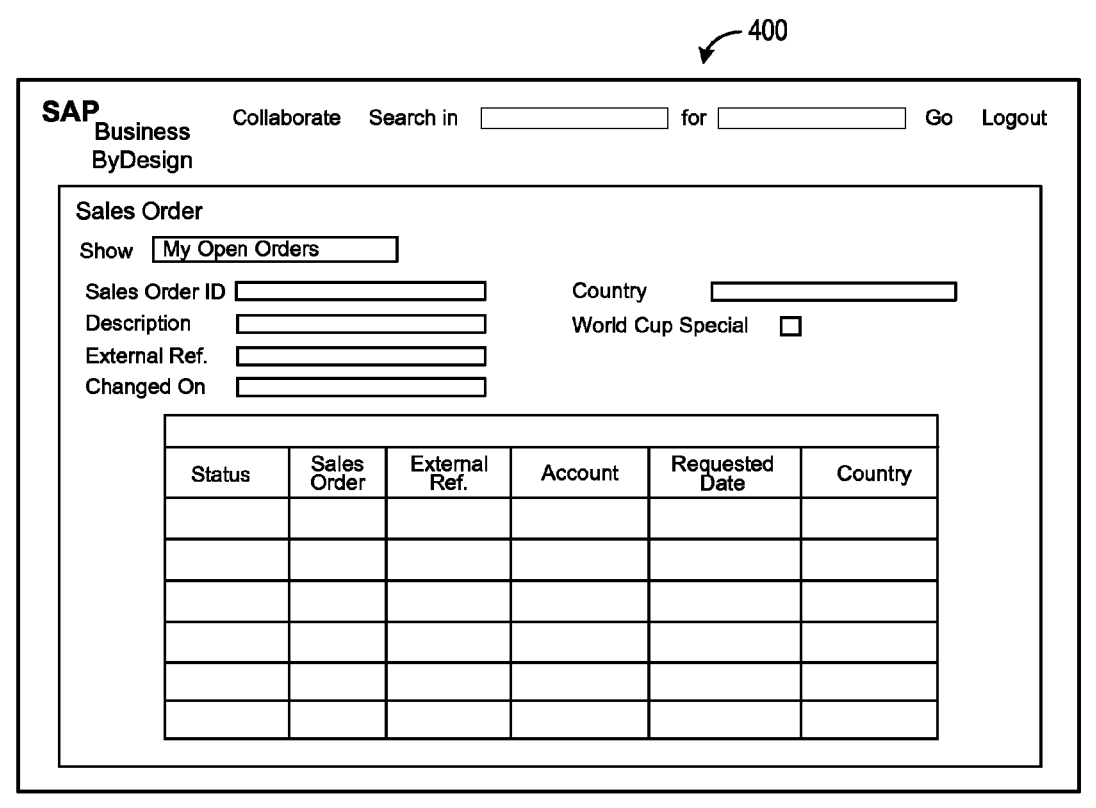

FIG. 4 is an outward view of interface 400 of a key user tool according to some embodiments. FIG. 4 may represent an on-demand Web-based solution in which user interface 400 is displayed by a Web browser. Interface 400 is user interface SALES_ORDER_UI associated with a SALES_ORDER business object (i.e., business object 210) and including reference field Country (i.e., reference field 217).

Embodiments may be used in conjunction with any user interface associated with any one or more business objects. Moreover, the consuming business entity may comprise a user interface, a form, a report, a message, a service interface, etc. The consuming business entity may be presented to the user at S310 in any suitable manner.

Next, at S320, an instruction to add an extension field to the consuming business entity is received from the user. The extension field is to be added based on a reference field of the consuming business entity (i.e., of the business object). As one example of S320, FIG. 4 illustrates user interface 400 and context menu 500. Context menu 500 is presented in response to "right-clicking" on the Country field of user interface 400. Context menu 500 provides several options, one of which is "Add Extension Field". Selection of the "Add Extension Field" option results in reception of the instruction at S320. In some embodiments of S320, the system automatically determines and proposes a reference field by evaluating the existing fields displayed on the screen.

Figure 6:
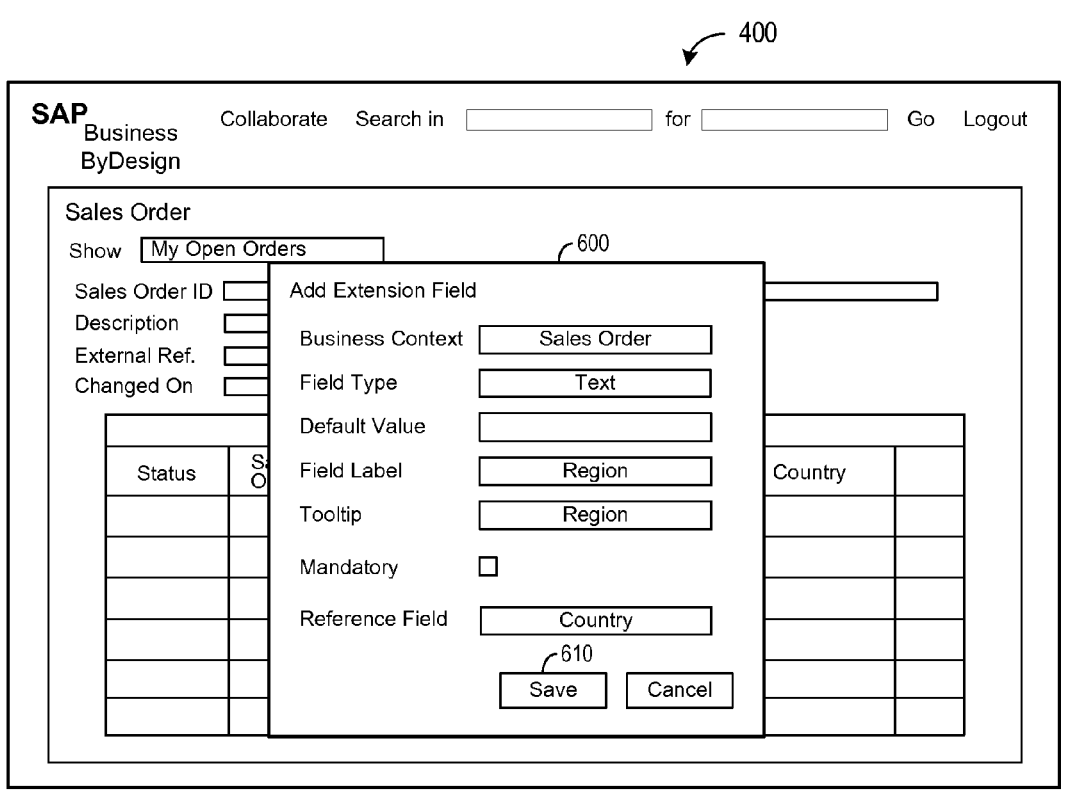
FIG. 6 is a view of a user interface according to some embodiments.

Continuing with the present example, dialog 600 of FIG. 6 may be presented to a user upon selection of the "Add Extension Field" option at S320. Dialog 600 includes input fields for specifying a Business Context of the extension field, a Field Type (e.g., string, currency, date, etc.), a Default Value, a Field Label, a Tooltip and a Reference Field. The user has input "Sales Order" as the Business Context, "Text" as the Field Type, "Region" as the extension field name, and "Region" as the Tooltip. According to the example, the Reference Field input field is pre-populated with "Country" because the Country field was right-clicked at S320. The Reference Field input field may initially be blank or populated with a name of a different default field. The reference field need not be displayed in user interface 600. Such a situation may occur in a case that the reference field was proposed by the system.

Further attributes of the extension field may also be derived from the reference field. In some embodiments, the properties of the extension field are identical to the properties of the reference field. Alternatively, the properties of the reference field may be derived based on the properties of one or more other fields selected from user interface 400. Any property may be dependent on field values (e.g., "mandatory only in U.S.").

The extension field may be added to the business object at S320 upon selection of Save icon 610. According to some embodiments, the metadata of the business object is changed to reflect the extension. In some implementations such as those described in commonly-assigned, co-pending U.S. application Ser. No. 12/829,617, entitled "Extensibility of Metaobjects", the extension field is created by generating metadata of a new "extension" business object, which is merged with the "extended" business object at runtime.

Figure 7:
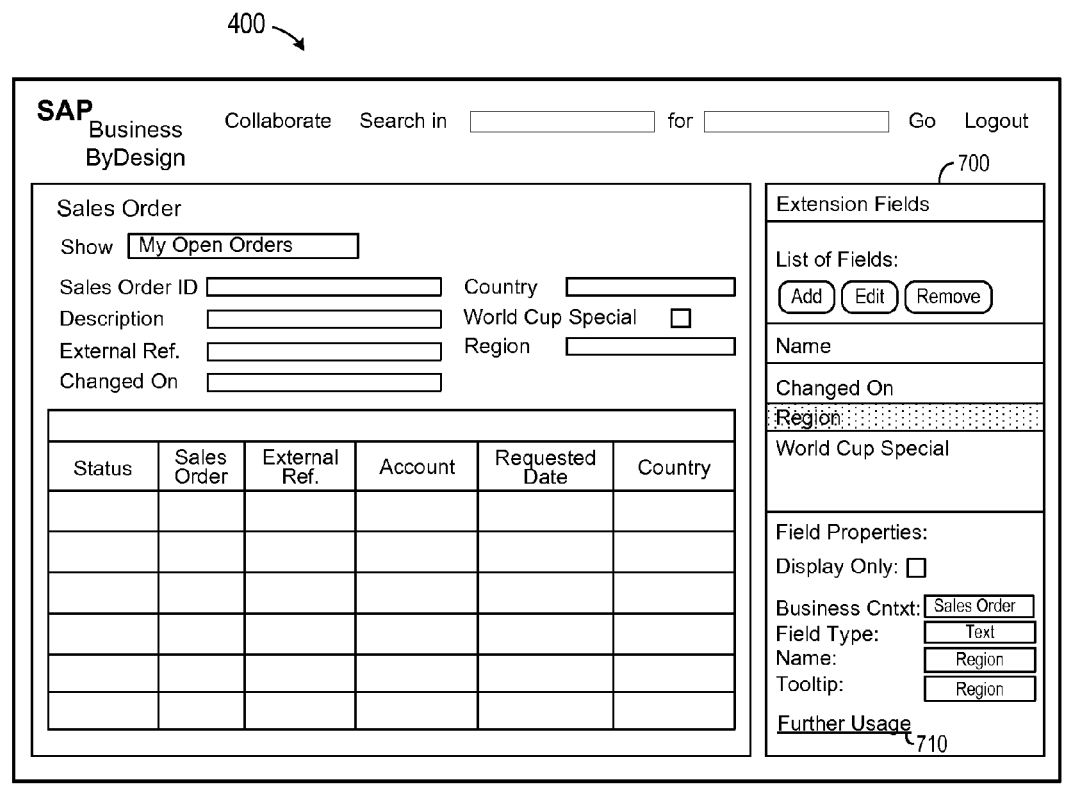

FIG. 7 illustrates user interface 400 along with pane 700 according to some embodiments. Pane 700 provides information regarding extension fields of the business object on which user interface 400 is based. Pane 700 shows three extension fields, which may be associated with the same or different reference fields and/or nodes of the business object. Extension field "Region" is highlighted in the example, and therefore the properties of the "Region" field are shown in the lower portion of pane 700.

Also shown in pane 710 is Further Usage link 710. A user may select Further Usage link 710 to identify other consuming business entities to which the highlighted extension field may be added. Flow proceeds from S320 to S330 upon user selection of Further Usage link 710.

At least one MDAV object model is identified at S330. Each of the identified MDAV object models includes a reference field which refers to the node of the business object to which the extension field was added. With reference to FIG. 2, it is assumed that an extension field was added to node 215 of business object 210 based on reference field 217. Accordingly, since MDAV 200 includes reference field 205 which refers to node 215 of business object 210, MDAV 200 is identified at S330. It should be noted that repository 120 may include metadata of other MDAVs which also include reference fields referring to node 215. These MDAVs are also identified at S330 according to some embodiments.

Some MDAVs may be technically unsuitable for extension. Such MDAVs might not be identified at S330, even if they include a reference field which refers to the node of the business object to which the extension field was added. According to some embodiments, S330 also includes determining which of the identified MDAVs are technically extendable, and using only those MDAVs in subsequent execution of process 300. Similarly, S330 may include determining which of the identified MDAVs are public (i.e., open to partner and customer developers), and using only those MDAVs in subsequent execution of process 300.

At S340, and also in response to selection of Further Usage link 710, at least one report associated with at least one of the identified MDAVs is determined. According to some embodiments, an analytical report is associated with an MDAV. More than one analytical report may be associated with a single MDAV. The MDAV with which a report is associated may be a union of several MDAVs. In some embodiments, it is determined at S340 that no reports are associated with the at least one of the identified MDAVs.

The determined reports are presented to the user at S350. FIG. 8 shows user interface 800 as presented to a user at S350 according to some embodiments. User interface 800 indicates the extension field (i.e., Region) and its Business Context (i.e., Sales Order).

Also shown are column 810 listing data sources (i.e., the MDAVs identified at S330) and column 820 listing reports (i.e., the reports determined at S340). Column 830 allows the user to select data sources and reports to be extended based on the extension field. Selection of a report to be extended automatically consists of selecting its associated data source. The user selects Add Field icon 840 to transmit the selections.

The selections are received at S360, and consist of at least one report associated with at least one of the identified MDAVs. The MDAV associated with each selected report is extended at S370. Finally, the selected report (or reports) is extended at S380.

If no reports are determined at S340, S350 may comprise presenting only indications of the at least one of identified MDAVs and S360 may comprise selection of at least one of the MDAVs for extension. The user may then create a report in the future based on the extended MDAV.

Figure 9:
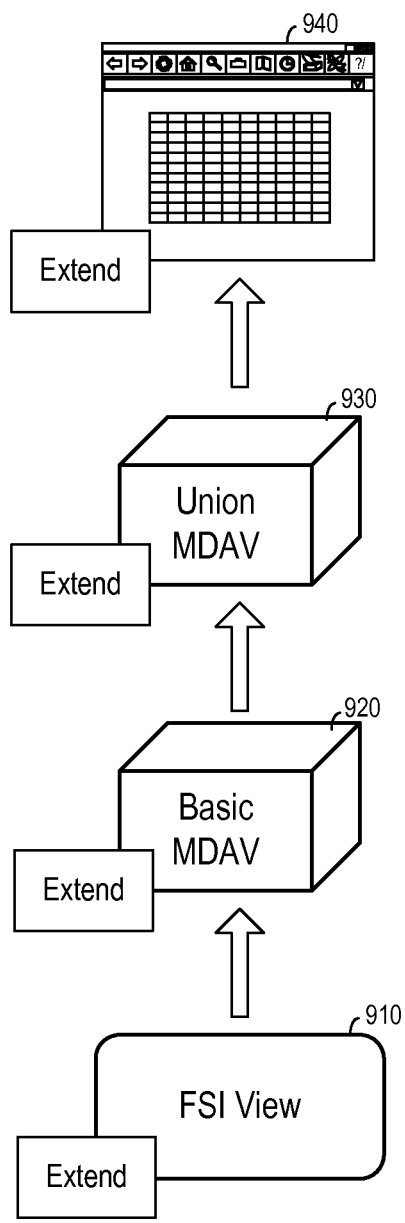
FIG. 9 is a block diagram illustrating extension of underlying metadata models according to some embodiments.

FIG. 9 illustrates extension of an MDAV and a report according to some embodiments of S370 and S380. As shown, Fast Search Infrastructure (FSI) view 910 includes metadata defining a view on the extended business object (not shown). FSI view 910 is extended by the extension field of the business object. Next, basic MDAV 920 is extended, followed by union MDAV 930, which includes basic MDAV 920 and at least one other MDAV (not shown). Assuming that the other MDAV is not associated with the underlying extended business object, extension of the other MDAV is not required. Analytical report 940 is lastly extended to include the extension field.

One or more of the extensions illustrated in FIG. 9 may be implemented by a separate extension metadata object defining the extension field and merged with the original object at runtime. Such a feature may permit the delivery of updates and changes to any of the underlying objects without overwriting or disrupting any previously-created extensions. Of course the updates and changes should not disturb the reference fields on which the extensions are based.

Figure 10:
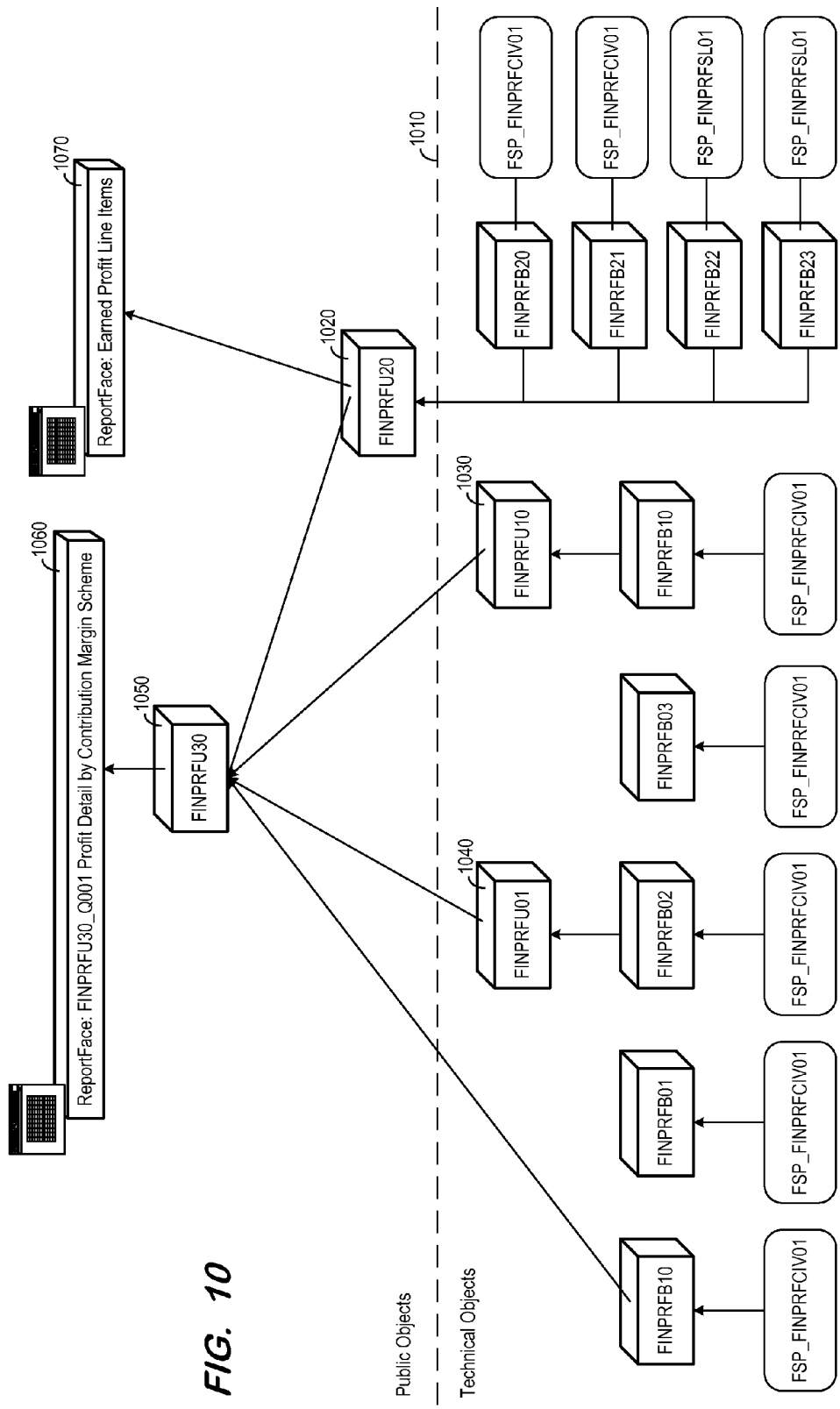
FIG. 10 illustrates the extension of a report associated with several multi-dimensional analytical models according to some embodiments.
Figure 11:
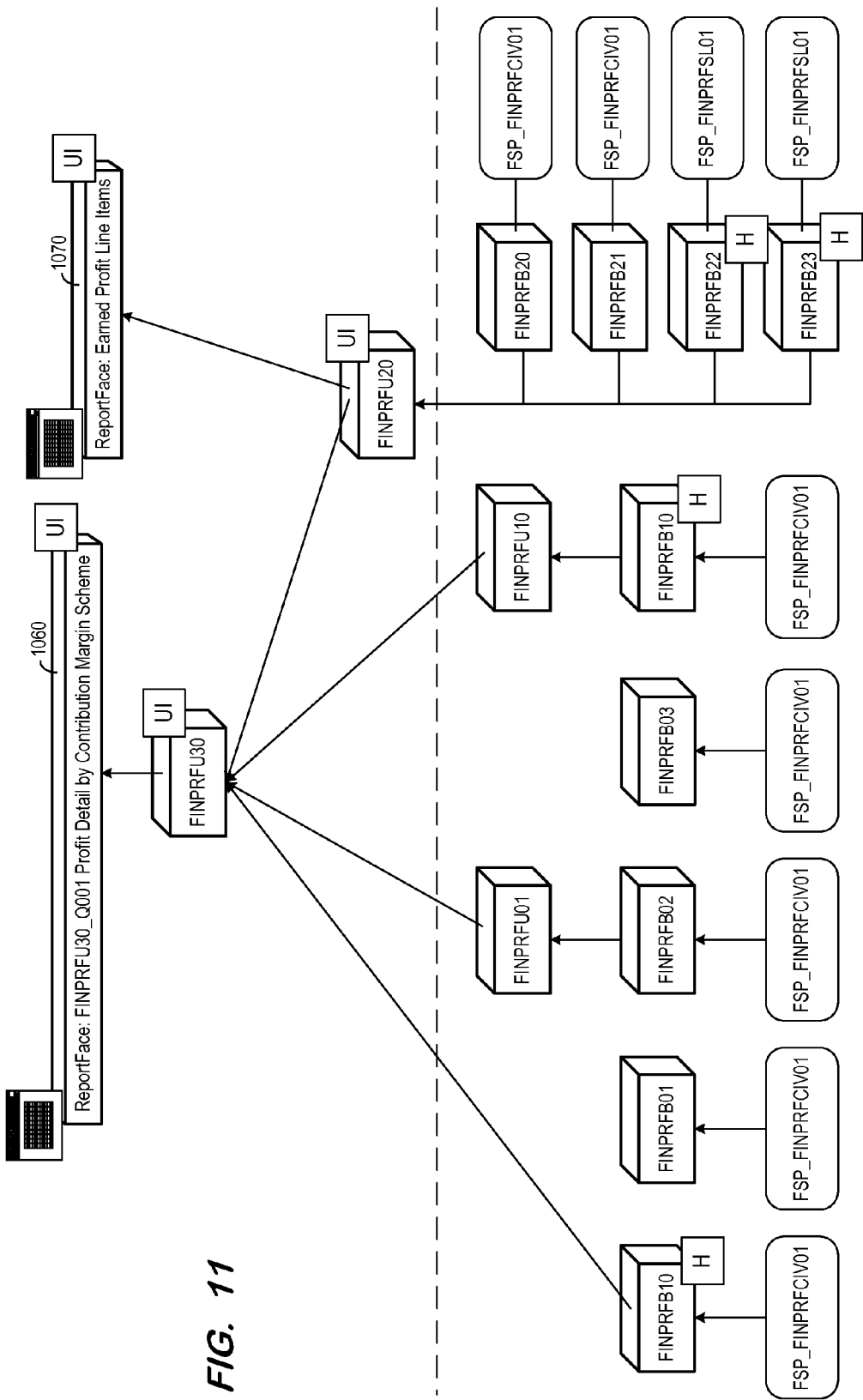
FIG. 11 illustrates the extension of a report associated with several multi-dimensional analytical models according to some embodiments.
Figure 12:
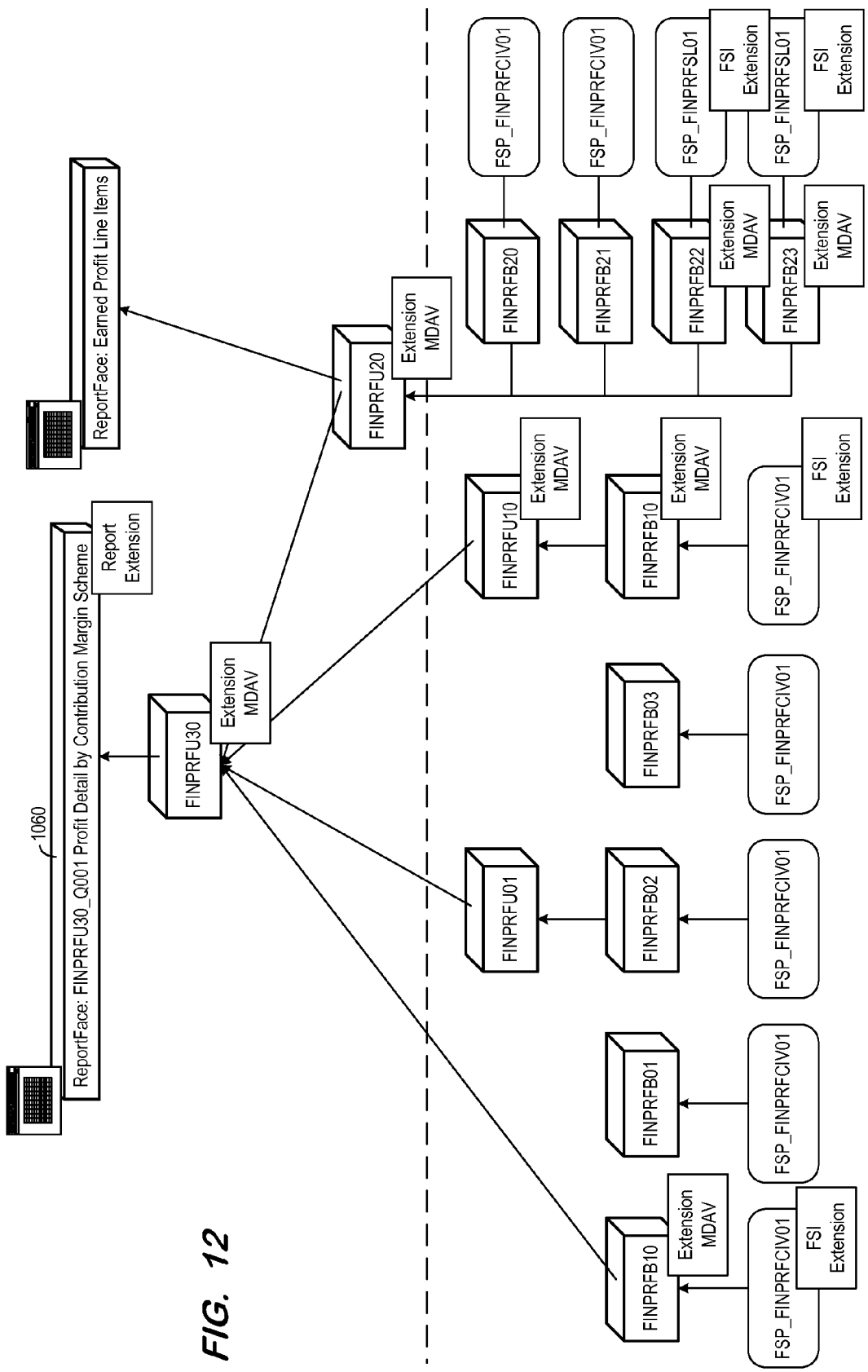
FIG. 12 illustrates the extension of a report associated with several multi-dimensional analytical models according to some embodiments.

FIGS. 10 through 12 illustrate a more complex example of extensibility according to some embodiments. Beginning with FIG. 10, it is noted that dashed line 1010 separates public objects from non-public, or "technical" objects. Several FSI views are represented by rounded rectangles and are each connected to an associated MDAV, represented by three-dimensional blocks. MDAVs 1020, 1030, 1040 and 1050 are each associated with one or more underlying MDAVs. Report 1060 is based on MDAV 1050, while report 1070 is based on MDAV 1020.

Turning to FIG. 11, it is assumed that an extension field has been added to a business object node as described with respect to S320 of process 300. Several MDAVs of FIG. 11 are marked "H" or "UI" to indicate that each of these MDAVs includes a reference field referring to the extended node. The MDAVs marked "H" are technical and will therefore be hidden from presentation to the user at S350, while the MDAVs marked "UI" (and reports based on those MDAVs) will be presented as shown in FIG. 8.

It will be assumed that the user selects report 1060 for extending at S360. As described above, all FSI views and MDAVs lying "between" the selected report and the extended business object node are then extended at S370 and S380. FIG. 12 illustrates extension of FSI views, MDAVs, and union MDAVs lying "between" report 1060 and the extended business object node, as well as extension of report 1060.

Figure 13:
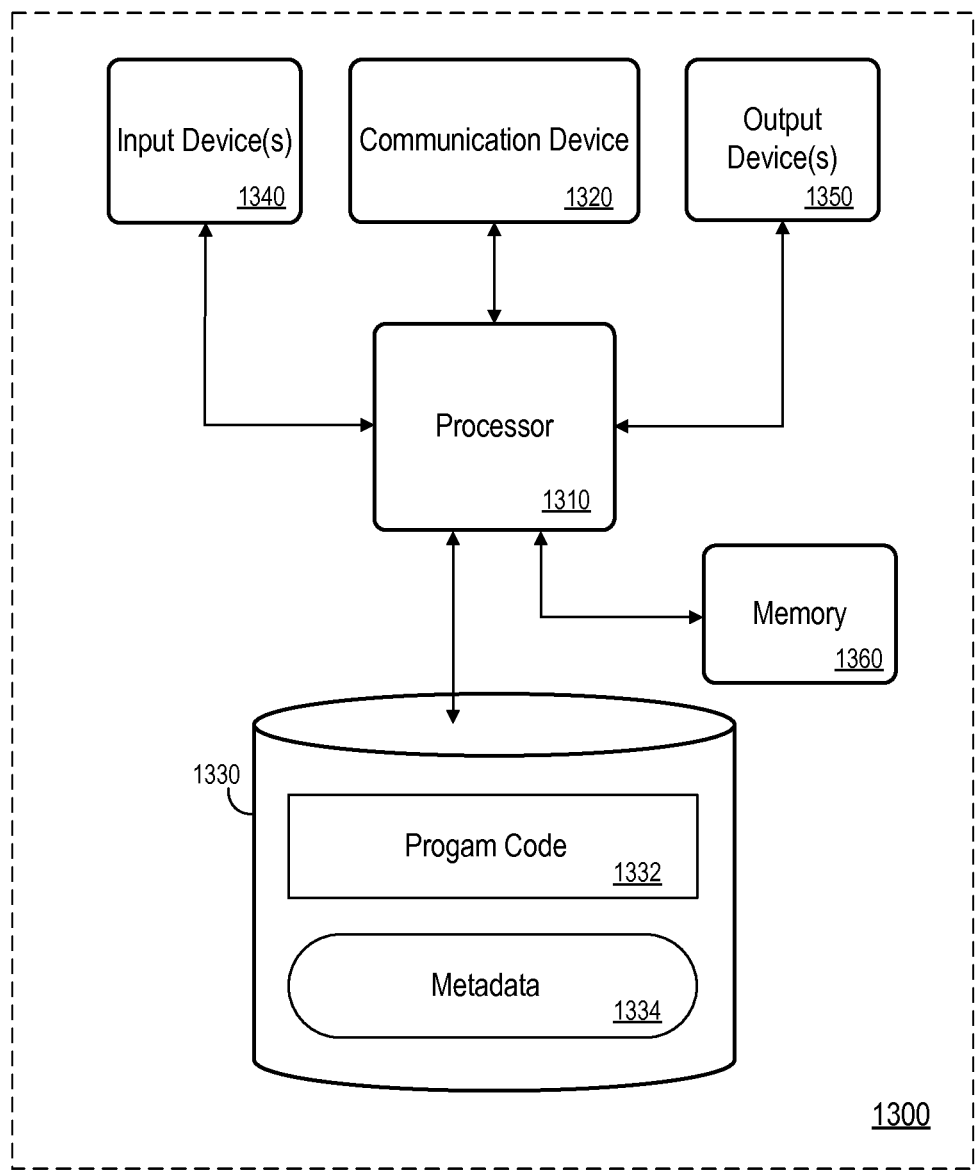
FIG. 13 is a block diagram of an apparatus according to some embodiments.

FIG. 13 is a block diagram of apparatus 1300 according to some embodiments. Apparatus 1300 may comprise a general-purpose computing apparatus and may execute program code to perform any of the functions described herein. Apparatus 1300 may comprise an implementation of one or more elements of system 100. Apparatus 1300 may include other unshown elements according to some embodiments.

Apparatus 1300 includes processor 1310 operatively coupled to communication device 1320, data storage device 1330, one or more input devices 1340, one or more output devices 1350 and memory 1360. Communication device 1320 may facilitate communication with external devices, such as an external design tool. Input device(s) 1340 may comprise, for example, a keyboard, a keypad, a mouse or other pointing device, a microphone, knob or a switch, an infra-red (IR) port, a docking station, and/or a touch screen. Input device(s) 1340 may be used, for example, to enter information into apparatus 1300. Output device(s) 1350 may comprise, for example, a display (e.g., a display screen) a speaker, and/or a printer.

Data storage device 1330 may comprise any appropriate persistent storage device, including combinations of magnetic storage devices (e.g., magnetic tape, hard disk drives and flash memory), optical storage devices, Read Only Memory (ROM) devices, etc., while memory 1360 may comprise Random Access Memory (RAM).

Program code 1332 of data storage device 1330 may be executable by processor 1310 to provide functions described herein, including but not limited to process 300. Embodiments are not limited to execution of these functions by a single apparatus. Metadata 1334 may include metadata of metaobjects and objects as described herein, including extension object metadata. Data storage device 1330 may also store data and other program code for providing additional functionality and/or which are necessary for operation thereof, such as device drivers, operating system files, etc.

The embodiments described herein are solely for the purpose of illustration. Those in the art will recognize other embodiments may be practiced with modifications and alterations limited only by the claims.

What is claimed is:

1. A method implemented by a computing system in response to execution of program code by a processor of the computing system, comprising:

receiving an instruction to add an extension field to a node of a business object object model;

identifying at least one multi-dimensional analytical view object model of multi-dimensional analytical view object models, each multi-dimensional analytical view object model including a reference field having properties that indicate a path to the node of the business object object model;

determining at least one report of reports associated with the identified at least one multi-dimensional analytical view object model;

receiving a selection of the determined at least one report of the reports;

extending the at least one multi-dimensional analytical view object model of the multi-dimensional analytical view object models associated with the report based on the extension field, wherein the extending the at least one multi-dimensional analytical view object model of the multi-dimensional analytical view object models comprises: creating an extension multi-dimensional analytical view object model based on the extension field, wherein the extension multi-dimensional analytical view object model and the at least one multi-dimensional analytical view object model of the multi-dimensional analytical view object models are instances of a same multi-dimensional analytical view metamodel;

extending a union multi-dimensional analytical view object model associated with the business object object model, with the at least one multi-dimensional analytical view object model of the multi-dimensional analytical view object models, and with the selected report; and extending the selected report based on the extension field.

2. The method according to claim 1, wherein identifying the at least one multi-dimensional analytical view object model comprises:

identifying a first plurality of multi-dimensional analytical view object models including a reference field referring to the node of the business object object model; and from the first plurality of multi-dimensional analytical view object models, determining a second plurality of multi-dimensional analytical view object models which are extendable.

3. The method according to claim 1, further comprising: extending a fast search infrastructure view object model associated with the business object object model and with the at least one multi-dimensional analytical view object model.

4. The method according to claim 3, further comprising: extending a union multi-dimensional analytical view object model associated with the business object object model, with the fast search infrastructure view object model, with the at least one multi-dimensional analytical view object model, and with the selected report.

5. A non-transitory medium storing processor-executable program code, the program code executable by a device to:

receive an instruction to add an extension field to a node of a business object object model;

identify at least one multi-dimensional analytical view object model of multi-dimensional analytical view object models, each multi-dimensional analytical view object model including a reference field having properties that indicate a path to the node of the business object object model;

determine at least one report of reports associated with the identified at least one multi-dimensional analytical view object model;

receive a selection of the determined at least one report of the reports;

extend the at least one multi-dimensional analytical view object model of the multi-dimensional analytical view object models associated with the report based on the extension field, wherein the extending the at least one multi-dimensional analytical view object model of the multi-dimensional analytical view object models comprises: creating an extension multi-dimensional analytical view object model based on the extension field, wherein the extension multi-dimensional analytical view object model and the at least one multi-dimensional analytical view object model of the multi-dimensional analytical view object models are instances of a same multi-dimensional analytical view metamodel;

extend a union multi-dimensional analytical view object model associated with the business object object model, with the at least one multi-dimensional analytical view object model of the multi-dimensional analytical view object models, and with the selected report; and extend the selected report based on the extension field.

6. The medium according to claim 5, wherein identification of the at least one multi-dimensional analytical view object model comprises:

determination of a first plurality of multi-dimensional analytical view object models including a reference field referring to the node of the business object object model; and from the first plurality of multi-dimensional analytical view object models, determination of a second plurality of multi-dimensional analytical view object models which are extendable.

7. The medium according to claim 5, the program code further executable by the device to: extend a fast search infrastructure view object model associated with the business object object model and with the at least one multi-dimensional analytical view object model.

8. The medium according to claim 7, the program code further executable by the device to: extend a union multi-dimensional analytical view object model associated with the business object object model, with the fast search infrastructure view object model, with the at least one multi-dimensional analytical view object model, and with the selected report.

9. A system comprising:

a computing device comprising:

a memory system storing processor-executable program code; and a processor to execute the processor-executable program code in order to cause the computing device to:

receive an instruction to add an extension field to a node of a business object object model;

identify at least one multi-dimensional analytical view object model of multi-dimensional analytical view object models, each multi-dimensional analytical view object model including a reference field having properties that indicate a path to the node of the business object object model;

determine at least one report of reports associated with the identified at least one multi-dimensional analytical view object model;

receive a selection of the determined at least one report of the reports;

extend the at least one multi-dimensional analytical view object model of the multi-dimensional analytical view object models associated with the report based on the extension field, wherein the extending the at least one multi-dimensional analytical view object model of the multi-dimensional analytical view object models comprises: creating an extension multi-dimensional analytical view object model based on the extension field, wherein the extension multi-dimensional analytical view object model and the at least one multi-dimensional analytical view object model of the multi-dimensional analytical view object models are instances of a same multi-dimensional analytical view metamodel;

extend a union multi-dimensional analytical view object model associated with the business object object model, with the at least one multi-dimensional analytical view object model of the multi-dimensional analytical view object models, and with the selected report; and extend the selected report based on the extension field.

10. The system according to claim 9, wherein identification of the at least one multi-dimensional analytical view object model comprises:

determination of a first plurality of multi-dimensional analytical view object models including a reference field referring to the node of the business object object model; and from the first plurality of multi-dimensional analytical view object models, determination of a second plurality of multi-dimensional analytical view object models which are extendable.

11. The system according to claim 9, the processor further to execute the processor-executable program code in order to cause the computing device to: extend a fast search infrastructure view object model associated with the business object object model and with the at least one multi-dimensional analytical view object model.

12. The system according to claim 11, the processor further to execute the processor-executable program code in order to cause the computing device to: extend a union multi-dimensional analytical view object model associated with the business object object model, with the fast search infrastructure view object model, with the at least one multi-dimensional analytical view object model, and with the selected report.

* * * * *